(12) United States Patent
Chandel

(10) Patent No.: US 8,006,245 B2
(45) Date of Patent: Aug. 23, 2011

(54) SYSTEM AND METHOD FOR STATE MANAGEMENT AND WORKFLOW CONTROL

(75) Inventor: Nitin Chandel, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1408 days.

(21) Appl. No.: 10/953,186

(22) Filed: Sep. 30, 2004

(65) Prior Publication Data

US 2006/0070068 A1  Mar. 30, 2006

(51) Int. Cl.
*G06F 9/46* (2006.01)
*G06F 9/44* (2006.01)

(52) U.S. Cl. ........ 718/102; 718/100; 718/101; 718/106; 717/117

(58) Field of Classification Search .............. 718/1–108; 707/103, 9; 705/8, 2, 75, 7, 39; 713/1; 717/107
See application file for complete search history.

(56) References Cited

U.S. PATENT DOCUMENTS

| | | | | |
|---|---|---|---|---|
| 5,630,127 A * | 5/1997 | Moore et al. | ............... | 707/103 R |
| 6,041,306 A * | 3/2000 | Du et al. | ............... | 705/8 |
| 6,067,522 A * | 5/2000 | Warady et al. | ............... | 705/2 |
| 6,820,082 B1 * | 11/2004 | Cook et al. | ............... | 707/9 |
| 6,862,573 B2 * | 3/2005 | Kendall et al. | ............... | 705/7 |
| 7,092,905 B2 * | 8/2006 | Behrenbrinker et al. | ....... | 705/39 |
| 7,228,407 B2 * | 6/2007 | D'Alo et al. | ............... | 713/1 |
| 2002/0120917 A1 * | 8/2002 | Abrari et al. | ............... | 717/110 |
| 2003/0028550 A1 * | 2/2003 | Lee et al. | ............... | 707/200 |
| 2003/0041125 A1 * | 2/2003 | Salomon | ............... | 709/220 |
| 2004/0024764 A1 * | 2/2004 | Hsu et al. | ............... | 707/9 |
| 2005/0038764 A1 * | 2/2005 | Minsky et al. | ............... | 706/47 |
| 2005/0102354 A1 * | 5/2005 | Hollenbeck et al. | .......... | 709/203 |
| 2005/0203956 A1 * | 9/2005 | Dweck et al. | ............... | 707/104.1 |

* cited by examiner

*Primary Examiner* — Emerson Puente
*Assistant Examiner* — Willy W Huaracha
(74) *Attorney, Agent, or Firm* — Shook Hardy & Bacon, LLP

(57) ABSTRACT

A system and method are provided for state management and workflow control. The system includes a metadata based state management system that can be used as a workflow control system. The system enables business rules to be separated from application logic, thus allowing businesses to easily change rules and adapt and respond to competition without requiring code changes. The system preferably includes database tables that interface with procedure calls in order to manage transactions in accordance with business rules. The business rules may include action permission rules that determine if a user is in a required state before allowing a selected action. A second set of rules determines an updated user state based on user actions.

27 Claims, 6 Drawing Sheets

STATE MANAGEMENT RULES 250

ACTION PERMISSION RULES
270

STATE CHANGING RULES
280

FIG. 3

SYSTEM AND METHOD FOR STATE MANAGEMENT AND WORKFLOW CONTROL

CROSS-REFERENCE TO RELATED APPLICATIONS

None.

STATEMENT REGARDING FEDERALLY SPONSORED RESEARCH OR DEVELOPMENT

None.

TECHNICAL FIELD

Embodiments of the present invention relate to a state management and workflow control system for facilitating business management of client transactions over a network.

BACKGROUND OF THE INVENTION

The increase of electronic commerce has created a necessity for efficient techniques for managing transactions executed through commerce conducted over a computer network. Typically, a computer application connected over a network to user computers enables users to participate in commerce electronically. Records of user transactions may be stored in databases. Conventional databases such as relational databases, object databases, and hierarchical databases may be used to store information related to user transactions. Databases have persistent storage capabilities, such that the storage of data is independent of the computer application state.

The computer applications that allow users to partake in electronic commerce typically includes coded business rules. For instance, a computer application that provides an electronic bidding system may include a rule stating that bidders who have retracted a past bid are ineligible for bidding on selected items. Alternatively, a computer application for shopping might regulate purchases based on a user's financial status. This type of restriction is typically coded within the computer application that is stored on a server accessible to the users. The computer application may access data stored in a database to examine a user's past history.

In existing systems, whenever a business changes its operating procedures and rules, its computer applications must be rewritten in accordance with the new rules. Rewriting of code within the computer application can be time consuming, cause delays, and exhaust resources.

Accordingly, a system is needed that manages states and controls workflow that is flexible and easily changed. A system is needed that enables business rules to be separated from application logic so that businesses can easily change rules and adapt and respond to competition in the fastest possible way without requiring code changes.

BRIEF SUMMARY OF THE INVENTION

Embodiments of the present invention are directed to a state management and workflow control system for managing business transactions conducted between multiple entities and an application over a computer network. The system includes a first set of rules for defining at least one entity prerequisite state required in order to perform an action and a second set of rules for defining an updated entity state based on an initial state and a performed action. Both the first set of rules and the second set of rules are separated from the application to facilitate rule addition and removal.

In an additional aspect of the invention, a state management and workflow control system is provided for managing business transactions conducted between multiple entities and an application server over a computer network. The system includes a set of database tables incorporating rules for managing entity status and rules for regulating entity action. The system additionally includes a set of processes stored in the application server. The procedure calls interact with the set of database tables to regulate transaction processing and to update the entity status.

In yet an additional aspect of the invention, a method is provided for managing business transactions conducted between multiple entities and an application server over a computer network. The method includes providing a set of database tables incorporating rules for managing entity status and for regulating entity action and interfacing the database tables with a set of procedure calls in an application server. The method additionally includes implementing the processes and set of database tables to update entity status and to manage transaction processing.

BRIEF DESCRIPTION OF THE DRAWINGS

The present invention is described in detail below with reference to the attached drawings figures, wherein:

FIG. 3 is a block diagram illustrating state management rules in accordance with an embodiment of the invention;

DETAILED DESCRIPTION OF THE INVENTION

I. System Overview

Embodiments of the invention include a method and system for state management and workflow control in a system for electronic commerce or other type of computerized application accessible over a network. The system separates application logic from business rules by encoding business rules within a database and enabling the rules to interface with procedures stored within an application server or other middle-tier structure. The business rules may include action permission rules and state changing rules.

Figure 1:
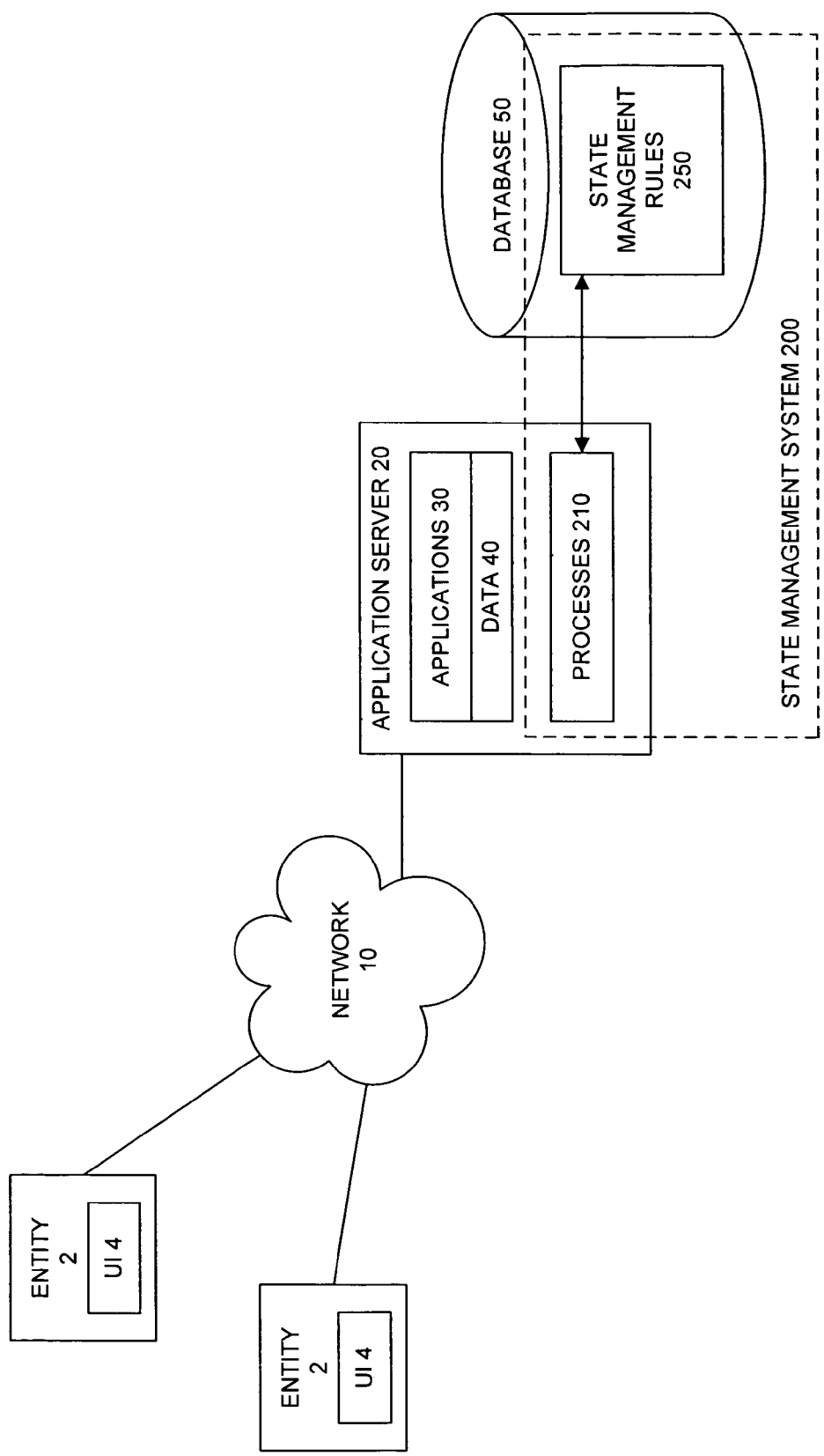
FIG. 1 is a block diagram illustrating an overview of a system in accordance with an embodiment of the invention.

FIG. 1 illustrates a system for state management and workflow control in accordance with an embodiment of the invention. Entities 2 communicate over a network 10 with an application server 20. The entities 2 may include consumers, advertisers, or other types of customers, or clients. The entities communicate with the application server 20 through a user interface 4 and may be engaged in bidding, buying, or other activity using the application server 20. The application server 20 may include applications 30, data 40, and processes 210. The application server 20 operates in a computerized environment as described below with respect to FIG. 2.

A database 50 may be accessible to the application server 20 and entity 2. The database 50 includes state management rules 250 and interfaces with the application server 20 through an application program interface or other mechanism. More specifically, the state management rules 250 communicate with the processes 210 that may be stored within the application server 20. The state management rules 250 and the processes 210 combine to form a state management system 200.

In embodiments of the invention and as will be further described below, the state management rules 250 may be encoded in a set of tables that are stored in a database. Processes 210 are called from the tables in order to manage requests of the entities 2. Each entity 2 may be a customer such as a consumer or advertiser having an account that is tracked by the by the state management system 200. The entities 2 may select actions from a customer user interface (UI) 4.

II. Exemplary Operating Environment

Figure 2:
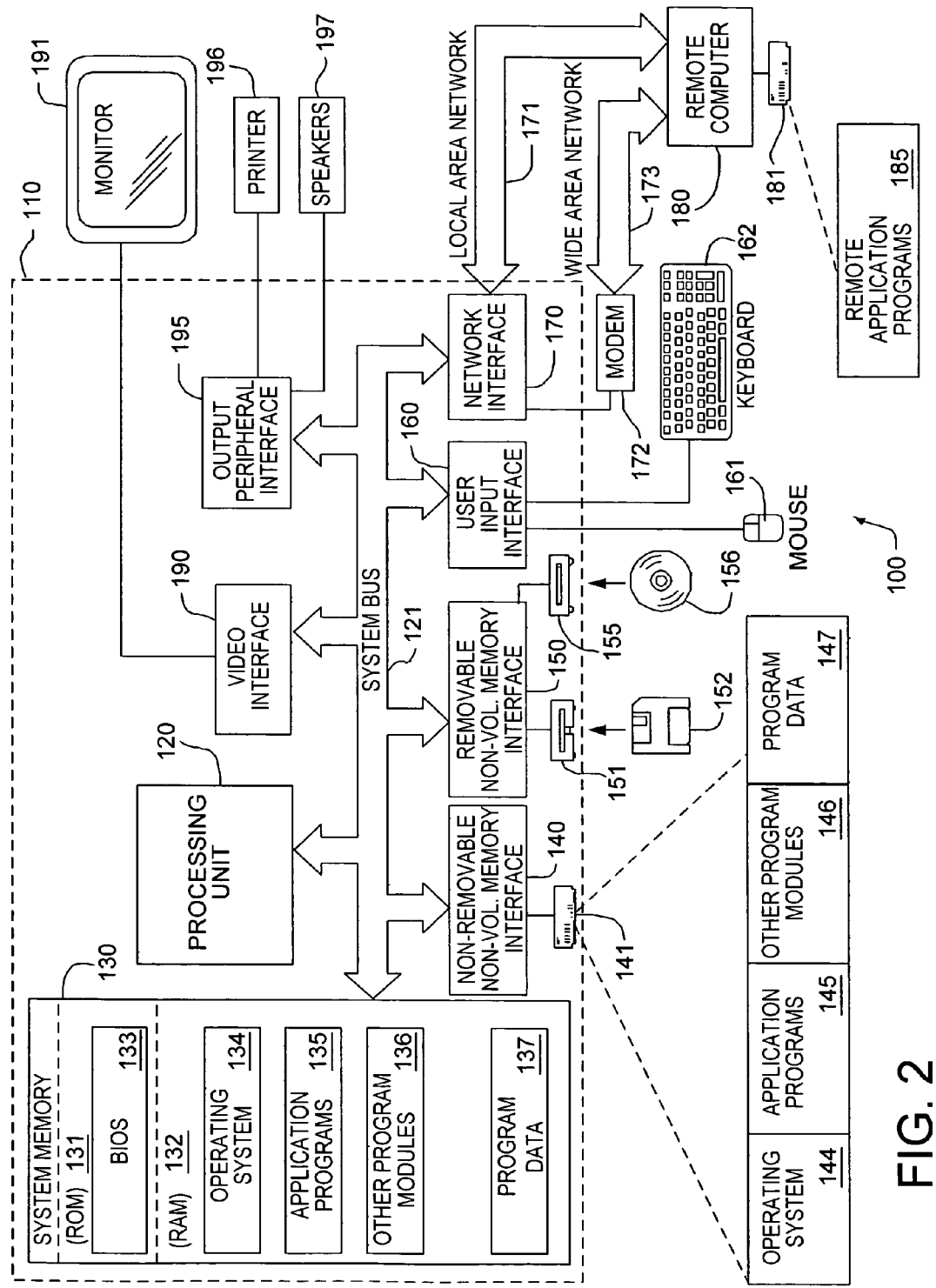
FIG. 2 is a block diagram illustrating a computerized environment in which embodiments of the invention may be implemented.

FIG. 2 illustrates an example of a suitable computing system environment 100 in which the state management system 200 may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive. 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. System and Method of the Invention

As set forth above, FIG. 1 illustrates a state management system 200 including state management rules 250 stored within the database 40. The state management rules 250 interface with processes 210 stored at the application server 20. The state management system 200 is further described below with reference to FIGS. 3-6.

FIG. 3 illustrates state management rules 250 in accordance with an embodiment of the invention. The state management rules 250 may include action permission rules 270 and state changing rules 280. The action permission rules 270 include information regarding a state required in order for an action to be allowed. Each entity participating in the system is in a particular state. For instance, each entity 2 may have an account that includes a financial status such as, for example, a credit worthy financial status, a credit warning status, or a bankrupt financial status. As an additional example, each entity 2 may have a participation state, such as a logged in state, a pause state, a locked state, or a deleted state. Every state may have a set of actions associated with it that are allowed and a set of actions that are disallowed. Thus, given the state of each entity 2, the entity 2 may have permission to take some actions but may not be permitted to take others.

Furthermore, states may remain the same, but a business may want to change rules based on customer behavior. These permissions or rules may be encoded in the action permission rules 270.

When an entity 2 takes an action, the state of the entity 2 may change. The set of state-changing rules 280 governs the changing of the state of each entity 2 based upon the action taken by the entity 2. The state-changing rules 280 consider a current state and the action performed and from this information, the state changing rules 280 determine a new state. The state changing rules 280 may consider status reasons, which are at a lower grain than the status. For instance, if a customer account is in a pause status, multiple reasons may exist for this status. Furthermore, the status may have been initiated by the entity 2 or by the application. The consideration of status reasons allows the flexibility to let different actions result in same states for the entity due to different reasons.

Figure 4:
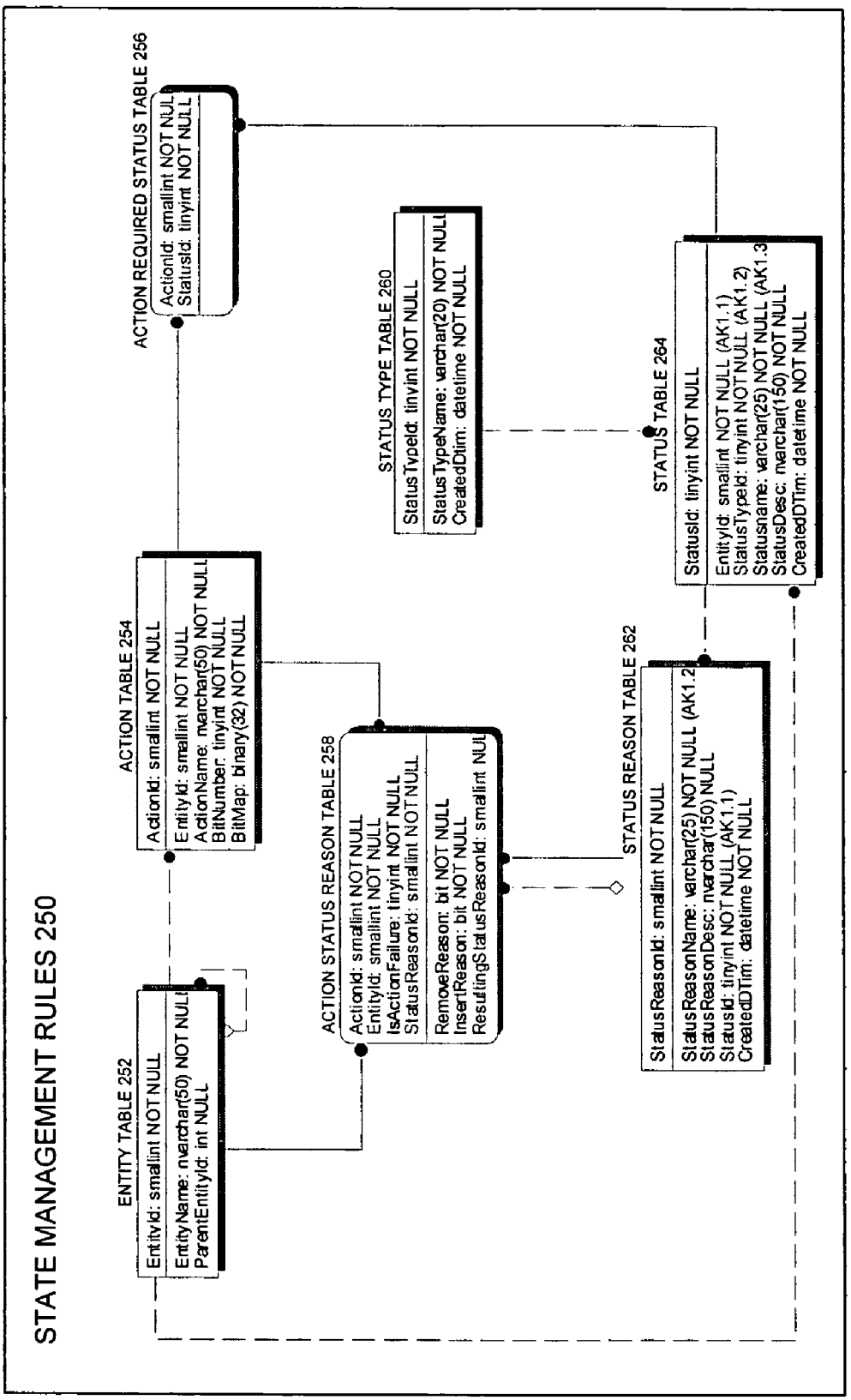
FIG. 4 is a block diagram illustrating further details of the state management rules in accordance with an embodiment of the invention.

FIG. 4 illustrates a set of tables for incorporation in the state management system 200 for incorporating the state management rules 250 and storing the metadata required to execute these rules as explained above with respect to FIG. 3. Metadata may include data regarding customer accounts, orders, campaigns etc. Storing the rules 250 in tables facilitates addition or alteration. Rules can simply be added to the tables.

The tables may include an entity table 252, an action table 254, an "ActionRequiredStatus" table 256, an "ActionStatusReason" table 258, a "StatusType" table 260, a "StatusReason" table 262, and a status table 264.

The entity table 252 may list all the types of entities that are present in the system.

The entities may form a hierarchy such that the table 252 has a self-referencing relationship to define the hierarchy. The entity table 252 may include an entity ID, an entity name, and a parent entity ID as shown.

The entity table 252 may be connected with the action table 254. The action table 254 may contain all of the actions that can be performed by the application server 20. Each action can only have the context of one entity, which is an attribute in the action table 254. Thus, the action table 254 may include an action ID, an entity ID, and an action name. Bitnumber and bitmap attributes may be used for security.

The action table 254 may be connected with the "ActionRequired" status or prerequisite table 256. The prerequisite table 256 may contain metadata for the prerequisite states required for an action. An action can only be formed if the entity on which it is being performed has the states defined in the metadata. As shown, the prerequisite table 256 may include an action ID and a status ID.

The entity table 252 and the action table 254 may be connected with the "ActionStatusReason" or state change table 258. The state change table 258 may contain metadata that defines how states should change once an action has been performed. The state changes are defined at a status reason level so that different actions that result in the same state have the flexibility of having their own reasons. All actions may have the context of one entity but they can result in state changes across multiple entities so part of a primary key (PK) of this table is the entity ID. The state change table 258 may include an "IsActionFailure" attribute. The "IsActionFailure" attribute gives flexibility to define metadata for an action when different states may result depending on the action success or failure. The state change table 258 may additionally include a "StatusReasonID", a "RemoveReason" attribute and an "InsertReason" attribute. The "RemoveReason" and "InsertReason" attributes define whether a need exists for inserting reasons or whether changing the state is sufficient. A "ResultingStatusReasonId" attribute may be used when a reason is removed and in the absence of other reasons, the entity needs a new state.

The "StatusType" or status type table 260 may support multiple status types per entity. A different status may be used on the same entity to represent different types of states. The status type table 260 may include a "StatusTypeID", a "StatusTypeName", and a created date and time variable.

The status table 264 may contain all of the states used by the entities. The "StatusReason" or status reason table 262 may contain all of the status reasons that result in the states defined in the status tables. Each status has at least one reason.

Figure 5:
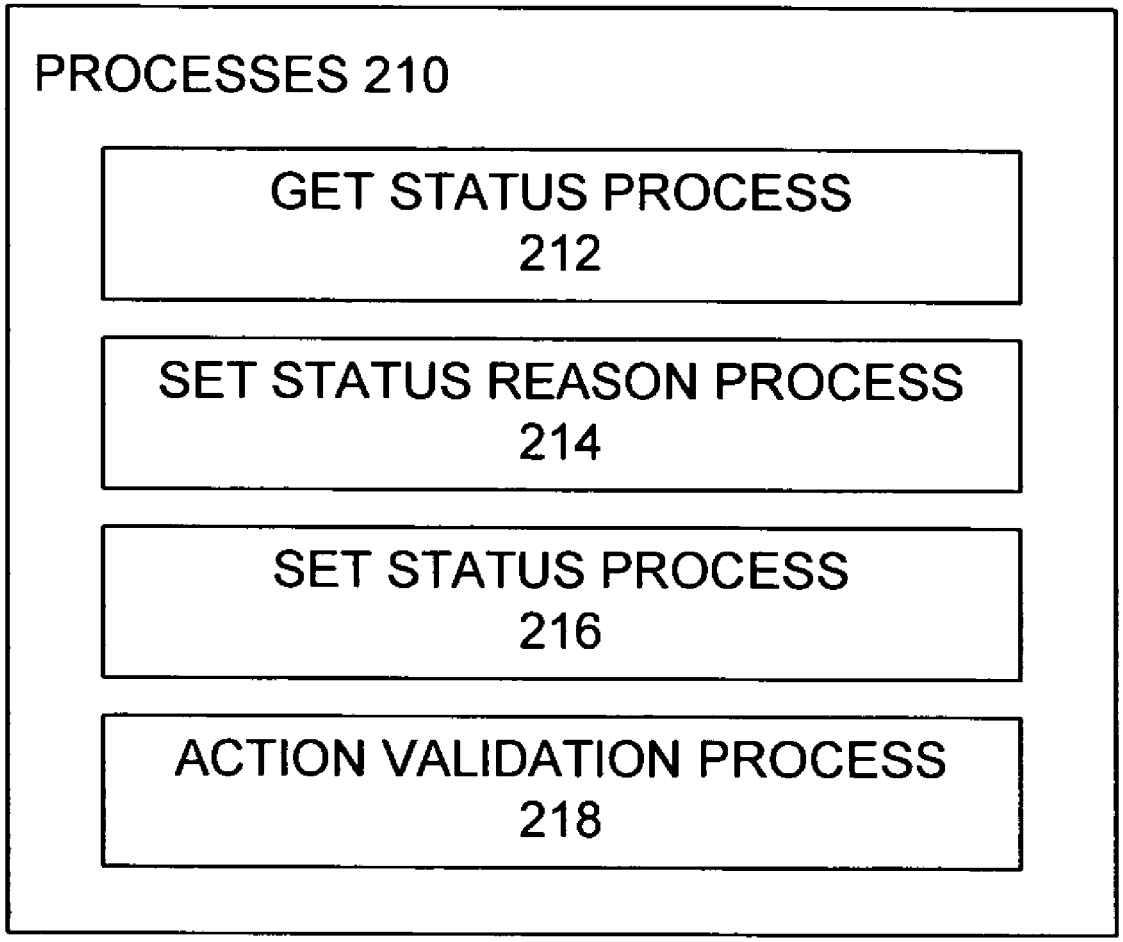
FIG. 5 is a block diagram illustrating processes for interfacing with the state management rules in accordance with an embodiment of the invention.

The tables described above interact with processes 210 to form the state management system 200. FIG. 5 is a block diagram illustrating exemplary processes 210. The processes may include a get status process 212, a set status reason process 216, and an action validation process 218.

The get status process 212 may returns status IDs for each status type based on entity name, action ID and entity primary key. The get status process 212 may also call the action validation process 218 to determine whether entity 2 is in a valid state for the selected action to be performed as determined by the action prerequisite states defined in the prerequisite table 256. The get status process 212 is generated as the database is built using the metadata defined in state change table 258.

If a reason exists for a requested action and the "InsertReason" or "RemoveReason" attribute is set, the set status reason process 214 may insert or remove a record in the status reason table 262 for the entity based on the "EntityName", "ActionName", and "EntityPK". The set status reason process 214 may be generated when the database is built using the metadata defined in the state change table 258.

The set status process 216 may receive an entity name, action name, and entity PK. The set status process 216 may update the status of the entity based on the existing reasons and the reasons defined in the metadata from the state change table 258 for that action.

An action validation process 218 may receive an action ID and an entity PK. This function may return a true or false after checking the entity states for the current entity and its parent entities as defined in the metadata from the prerequisite table 256. The action validation process 218 may be generated as the database is built using the metadata defined in prerequisite table 258.

Figure 6:
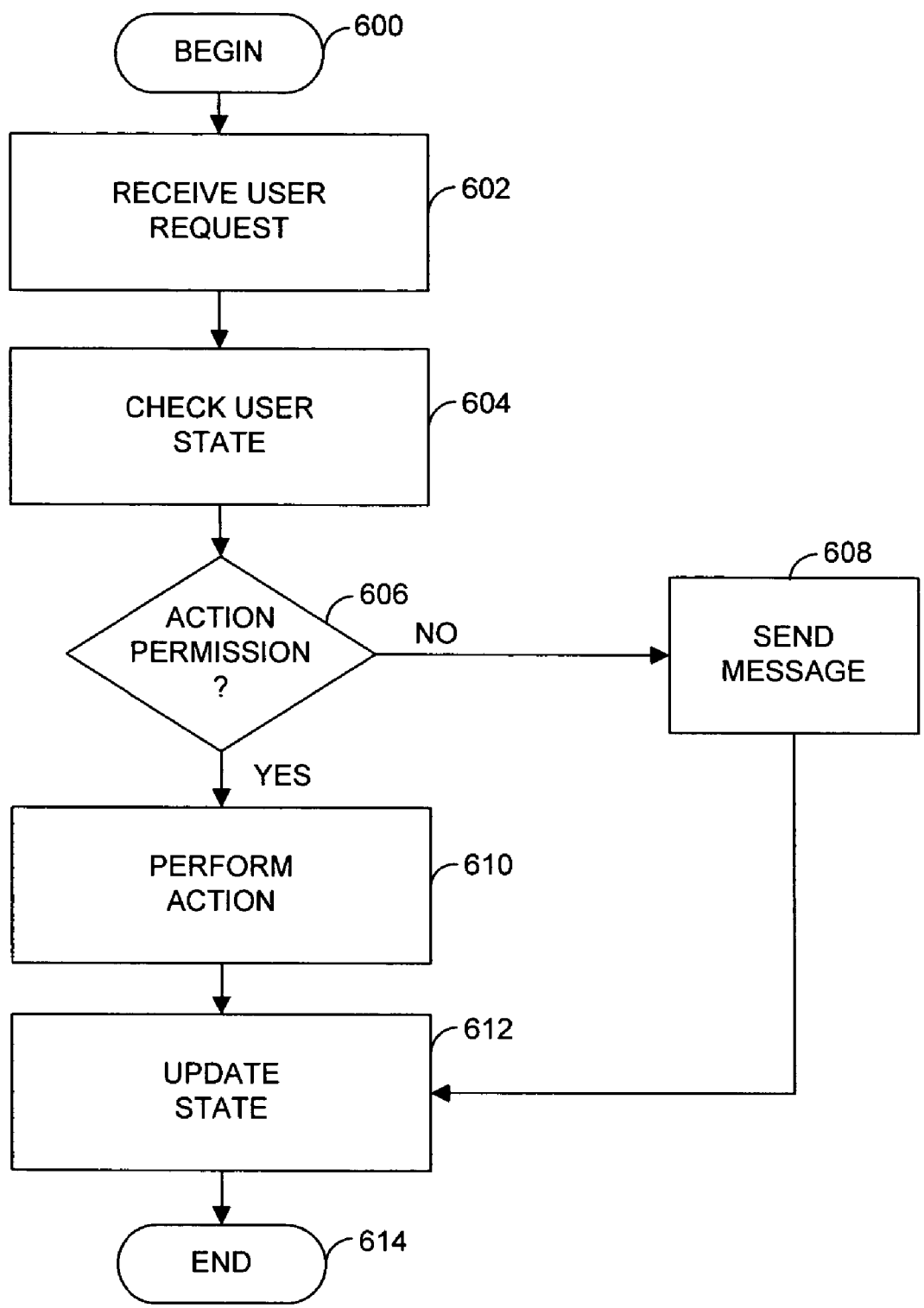
FIG. 6 is a flowchart illustrating operation of the state management system in accordance with an embodiment of the invention.

FIG. 6 illustrates operation of the state management system 200 in accordance with an embodiment of the invention. The process begins in step 600. In step 602, the application server 20 receives a user request. In step 604, the user state is checked. The state management system 200 checks the user's state in using the externally stored tables, such as through the status table 264, by implementing the get status process 212.

In step 606, the get status process 212 may also call the action validation process 218 to determine whether the entity's state is a valid state for this action to be performed. The action validation process 218 checks for the action prerequisite states defined in the prerequisite table 256.

If the entity 2 does not have permission to perform the selected action because the entity 2 is not in a requisite state, in embodiments of the invention, the state management system 200 will pass this information to the application, which may send a message to the entity 2 in step 608 denying permission. If the entity 2 does have permission based on the user's current state, the application stored in the application server 20 will perform the action in step 610. In step 612, the state changing rules 280 may act in conjunction with the set status process 216 to change a user's state in the state management rules 250.

If a reason exists for a requested action and the "InsertReason" or "RemoveReason" attribute is set, the set status reason process 214 may insert or remove a record in the status reason table 262 for the entity based on the "EntityName", "ActionName", and "EntityPK". The process ends in step 614.

In summary, a metadata based state management system 200 is disclosed that can be used as a workflow control system. The system 200 enables the business rules to be independent of the application logic, thus allowing businesses to easily change rules and adapt and respond to competition in the fastest possible way without requiring code changes. The system 200 is flexible and may include a set of actions that map to stored procedure calls and method calls from the middle tier. Two sets of rules are associated with each action. The first set defines the states required for the action to be allowed and the second set defines how an action affects the state on a particular entry.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. One or more computer storage media having computer-useable instructions embodied thereon for performing a state management and workflow control method for managing business transactions conducted between multiple users and an application over a computer network, the instructions comprising:

a set of user action permission rules defining at least one user prerequisite state required in order to perform an action requested by a user, the user having at least one user initial state when the user requests the action,
wherein the user is a customer having an account tracked using the state management and workflow control method, and
wherein the action requested by the user is performed if the at least one user initial state satisfies the at least one user prerequisite state;

at least one status reason stored in association with the at least one user initial state, wherein the at least one status reason is a reason why the user has the at least one user initial state; and a set of user state changing rules defining how to update the at least one user initial state in response to performance of the action requested by the user,
wherein the state to which the user is updated depends on the performed action, the at least one user initial state, and the at least one stored status reason,
wherein consideration of the at least one stored status reason allows performance of different actions requested by the user to result in the same updated state for different reasons, and
wherein both the set of user action permission rules and the set of user state changing rules are separated from the application to facilitate rule addition and removal.

2. The one or more computer storage media of claim 1, further comprising a set of database tables storing the set of user action permission rules and the set of user state changing rules.

3. The one or more computer storage media of claim 2, wherein the set of database tables includes a prerequisite table storing the at least one user prerequisite state for performance of the action requested by the user.

4. The one or more computer storage media of claim 3, wherein the set of database tables further comprises an entity table listing each type of participating user.

5. The one or more computer storage media of claim 4, wherein the set of database tables further comprises an action table storing each possible action that can be requested by the user.

6. The one or more computer storage media of claim 2, wherein the set of database tables further comprises a state change table containing metadata defining how user initial states change upon performance of the action requested by the user.

7. The one or more computer storage media of claim 6, wherein the set of database tables further comprises a status table that contains each possible state for the user.

8. The one or more computer storage media of claim 7, further comprising a status reason table that includes, for each possible state included in the status table, at least one status reason.

9. The one or more computer storage media of claim 2, further comprising a set of processes for communicating with the database tables.

10. The one or more computer storage media of claim 9, wherein the set of processes comprises a get status process that returns the at least one initial user state.

11. The one or more computer storage media of claim 9, wherein the set of processes comprises a set status reason process that updates a status reason table storing status reasons.

12. The one or more computer storage media of claim 9, wherein the set of processes comprises a set status process that updates the at least one initial user state based on the user state changing rules and the at least one status reason stored in association with the at least one user initial state.

13. The one or more computer storage media of claim 9, wherein the set of processes comprises an action validation process that determines if the at least one user initial state satisfies the at least one user prerequisite state for the action requested by the user.

14. One or more computer storage media having computer-useable instructions embodied thereon for performing a state management method for managing business transactions conducted between multiple entities and an application over a computer network, the media comprising:
   a set of database tables incorporating:
      a set of user action permission rules defining at least one user prerequisite state required in order to perform an action requested by a user, the user having at least one user initial state when the user requests the action,
         wherein the user is a customer having an account tracked using the state management and workflow control method, and
         wherein the action requested by the user is performed if the at least one user initial state satisfies the at least one user prerequisite state,
      at least one status reason stored in association with the at least one user initial state, wherein the at least one status reason is a reason why the user has the at least one user initial state, and
      a set of user state changing rules defining how to update the at least one user initial state in response to performance of the action requested by the user,
         wherein the state to which the user is updated depends on the performed action, the at least one user initial state, and the at least one stored status reason, and
         wherein consideration of the at least one stored status reason allows performance of different actions requested by the user to result in the same updated state for different reasons; and
   instructions comprising a set of processes stored in an application server, the processes interacting with the set of database tables to regulate transaction processing and to update the at least one user initial state.

15. The one or more computer storage media of claim 14, wherein the set of database tables includes a prerequisite table storing the at least one user prerequisite state for performance of the action requested by the user.

16. The one or more computer storage media of claim 15, wherein the set of database tables further comprises an entity table listing each type of participating user.

17. The one or more computer storage media of claim 16, wherein the set of database tables further comprises an action table storing each possible action that can be requested by a user.

18. The one or more computer storage media of claim 17, wherein the set of database tables further comprises a state change table containing metadata defining how user initial states change upon performance of the action requested by the user.

19. The one or more computer storage media of claim 18, wherein the set of database tables further comprises a status table that contains each possible state for the user.

20. The one or more computer storage media of claim 19, wherein the set of databases tables further comprises a status reason table that includes, for each possible state included in the status table, at least one status reason.

21. The one or more computer storage media of claim 14, wherein the set of processes comprises a get status process that returns the at least one initial user state.

22. The one or more computer storage media of claim 14, wherein the set of processes comprises a set status reason process that updates a status reason table storing status reasons.

23. The one or more computer storage media of claim 14, wherein the set of processes further comprises a set status process that updates the at least one initial user state based on the user state changing rules and the at least one status reason stored in association with the at least one user initial state.

24. The one or more computer storage media of claim 14, wherein the set of processes further comprises an action validation process that determines if the at least one user initial state satisfies the at least one user prerequisite state for the action requested by the user.

25. A method for managing business transactions conducted between multiple entities and an application server in a state management system over a computer network, the method comprising:
   providing a set of database tables incorporating:
      a set of user action permission rules defining at least one user prerequisite state required in order to perform an action requested by a user, the user having at least one user initial state when the user requests the action,
         wherein the user is a customer having an account tracked by the state management system, and
         wherein the action requested by the user is performed if the at least one user initial state satisfies the at least one user prerequisite state, and
      at least one status reason, wherein the at least one status reason is a reason why the user has the at least one user initial state, and
      a set of user state changing rules defining how to update the at least one user initial state in response to performance of the action requested by the user,
         wherein the state to which the user is updated depends on the performed action, the at least one user initial state, and the at least one status reason,
         wherein consideration of the at least one stored status reason allows performance of different actions requested by the user to result in the same updated state for different reasons; and
      and wherein the set of database tables comprises a prerequisite table that stores the at least one user prerequisite state for performance of the action requested by the user, an entity table listing each type of participating user, an action table storing each possible action that can be requested by the user, a status table that contains each possible state for the user, a status reason table that includes, for each possible state included in the status table, at least one status reason for having the possible state and a state change table containing metadata defining how the at least one user initial state changes upon performance of the action requested by the user;

interfacing the database tables with a set of processes in an application server, wherein the set of processes comprises a get status process that returns the at least one initial user state and a set status reason process that updates the status reason table; and implementing the processes and set of database tables to update the at least one user initial state and to manage transaction processing, wherein the implementing step is carried out on the application server.

26. The method of claim 25, wherein the set of processes further comprises a set status process that updates the at least one initial user state based on the user state changing rules and the at least one status reason for having the at least one user initial state.

27. The method of claim 25, wherein the set of processes further comprises an action validation process that determines if the at least one user initial state satisfies the at least one user prerequisite state for the action requested by the user.

* * * * *